Nov. 5, 1957  F. SUND  2,812,029
ROCK PICKER
Filed Sept. 7, 1954  2 Sheets-Sheet 1

INVENTOR
FRED SUND
BY Williamson, Williamson,
Schroeder & Adams
ATTORNEYS

Nov. 5, 1957　　　　　F. SUND　　　　　2,812,029
ROCK PICKER
Filed Sept. 7, 1954　　　　　　　　　　2 Sheets-Sheet 2

INVENTOR
FRED SUND
BY Williamson, Williamson
Schroeder & Adams
ATTORNEYS

United States Patent Office 2,812,029
Patented Nov. 5, 1957

2,812,029

ROCK PICKER

Fred Sund, Newburg, N. Dak.

Application September 7, 1954, Serial No. 454,359

3 Claims. (Cl. 171—85)

This invention relates to a rock picker and more particularly to an apparatus for picking rocks from the ground and discharging accumulations of the rocks from the apparatus.

A number of rock picking devices have been proposed in the prior art, some of which have picker fingers and tined elements extending forwardly of a vehicle for dislodging and raising stones and rocks from the ground to a discharge at the side or rear of the device. Some of these devices have elaborate mechanisms requiring fixed tine members which are angulated forwardly and downwardly to dig into the ground for a limited depth. These tines cause rocks to be shoved upwardly on the sloping plane formed by the tines and rakes or other reciprocating means advance the rocks upwardly to a discharge point. Often such fixed tine members become damaged and broken when a large rock is encountered. Others of prior art pickers have oscillating teeth which are adapted to dig into the ground and lift out the rocks physically. This type of rock digger requires large amounts of power to effect the picking job and furthermore is apt to leave large clods of earth clinging to the rocks. Other devices employ traveling teeth or tines on an endless belt arrangement wherein the tines move forwardly against the ground as the device moves forwardly over the terrain. Such arrangement has the advantage of combining a forward and upward movement and avoids the shock of vibration occasioned by large reciprocating members. I believe that inventors have been led away from such arrangement, first because of the great power required to dig the teeth into the ground against the travel of the vehicle; secondly, because of impositive picking and discharging action in an ordinary endless belt arrangement; and thirdly, because the counter-travel of tines or teeth against rocks and stones while traveling in a forward direction tends to impel or throw the rocks away from the mechanism rather than cradling and lifting the rocks and stones. This effect is particularly noted at the radial turns where the centrifugal force is the greatest.

It is an important object of my invention to overcome the above noted objections to a tined endless flexible rock picker and to provide an efficient and easily powered device which will remove rocks from the surface of the terrain or closely thereunder.

It is another object of the invention to provide a rock picking machine having forwardly moving picker fingers or tines which will pick up rocks, remove the excess dirt therefrom and efficiently discharge them from the machine.

It is a further object of the invention to provide means in cooperation with a forwardly moving tined endless element which will permit the controlled accumulation of rocks and earth for efficient collecting by the tines to separate out the rocks and also remove the earth clinging thereto.

It is a still further object of the invention to provide a rock picker of the class described in which rocks and earth which tend to accumulate before the traveling tines will be put to use so as to aid in picking and cleaning the rocks and yet will be moved along together with the device with the expenditure of but a small amount of energy.

These and other objects and advantages of the invention will more fully appear from the following description made in connection with the accompanying drawings, wherein like reference characters refer to the same or similar parts throughout the several views, and in which:

Fig. 3 is a detailed vertical section of the guideway showing the distribution of tine shafts thereabout in the guided travel of the flexible endless element during operation; unessential portions of the view are omitted.

Figure 1:
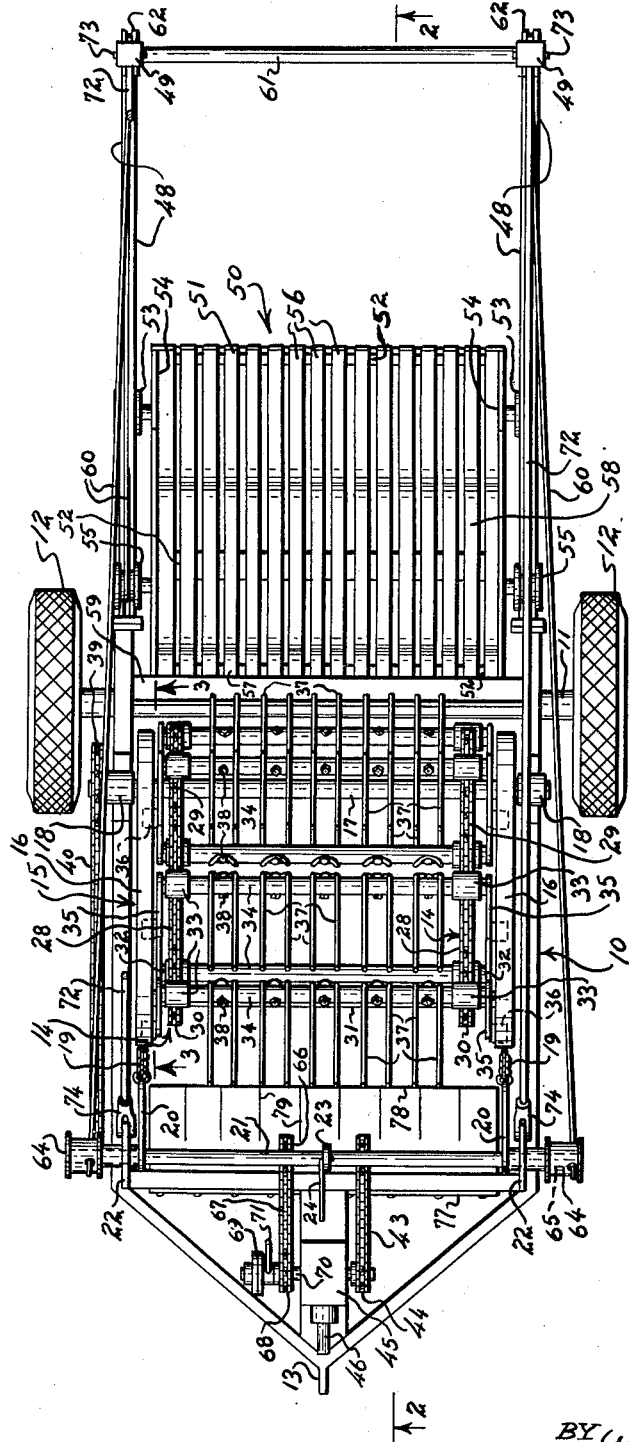
Fig. 1 is a top plan view of my rock picking device.

With continued reference to the drawing, Fig. 1 is a top plan view of my rock picker which has a frame structure indicated generally at 10 mounted upon an axle 11 which in turn is supported on rubber tired wheels 12 for movement along rocky terrain. The forward portion of the frame structure 10 converges into a drawbar 13 for attachment to a vehicle such as a tractor (not shown). On the framework 10 is mounted an endless flexible element indicated generally at 14, the endless flexible element being provided with a driven rolling movement about a pair of spaced transverse axes secured with respect to the frame structure 10.

The mounting of the endless flexible element 14 is accomplished through a mounting member 15, the mounting member 15 in turn comprising a side element 16 at each side adjacent the frame structure 10 and disposed medially therein.

Figure 2:
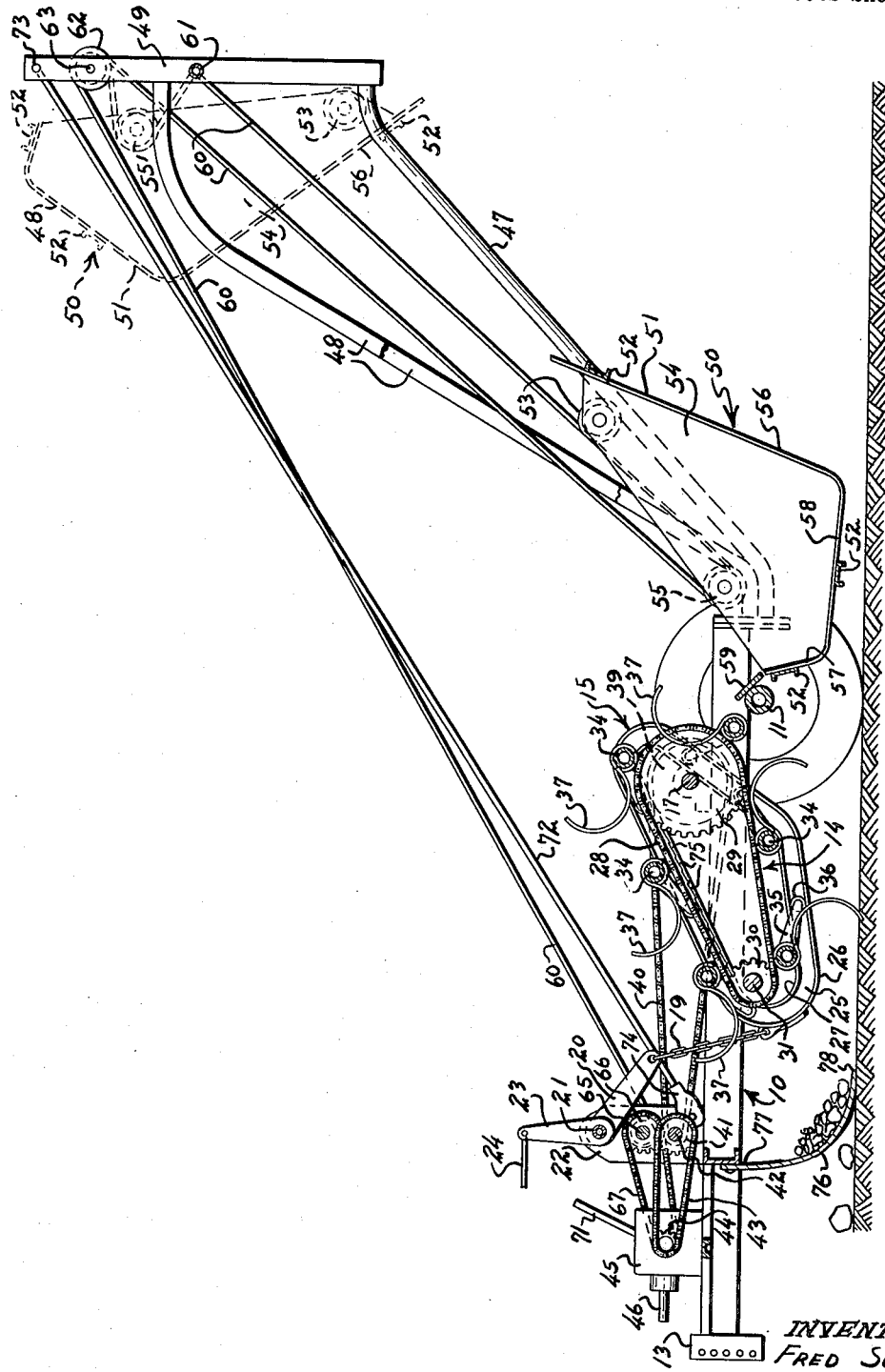
Fig. 2 is a vertical section of the entire device taken on the line 2—2 of Fig. 1 and looking in the direction of the arrows thereof.

A rear shaft 17 is journaled in the bearings 18 which in turn are secured to the frame 10 and shaft 17 likewise provides a pivotal securing means for the side members of mounting structure 15 as shown in Figs. 1 and 2. The forward ends of the mounting member sides 16 are secured at each side to a retractable member such as chain 19, each of said chains 19 extending upwardly in fixed relation with corresponding arms 20 as shown. The arms 20 are secured radially to a transverse shaft 21 which is journaled across bearing standards 22, the shaft 21 having a crank 23 pivotally engaged by a crank rod 24 which may be actuated by such means as a hydraulic ram (not shown) for adjusting the height of the forward end of the mounting member in pivotal relation with the frame structure 10 and in clearance with the terrain. To the inside of the side members 16 are provided respective guideways 25, the guideways being defined by a pair of laterally extending curved flanges 26 at the outside and 27 at the inside as shown in Fig. 2.

The flexible member 14 preferably comprises a pair of suitable chains 28, one at each side of the device, each of which is revolvably mounted on a pair of sprocket wheels, the larger driving sprocket being indicated at 29 and secured to shafts 17 while the smaller forward sprocket 30 is secured to shaft 31. Shaft 31 in turn is journaled across the mounting member 15 by means of a bearing 32 at each side member 16 of the mounting member.

Each of the chains 28 has secured thereto in spaced relation therealong, a plurality of bearing lugs 33 as shown more clearly in Fig. 1. The bearing lugs 33 on each of the spaced chains 28 are in transverse alignment and each corresponding pair rotatably receives a shaft 34 in normal alignment with the longitudinal disposition of frame 10, and each of the shafts 34 being in spaced parallel relation one with the others.

The outer ends of the shafts 34 extend beyond their respective bearing members 33 and have secured thereto radial links or arms 35 as shown in Figs. 1 and 2. The arms 35 have roller elements 36 rotatably mounted adjacent the terminus thereof as shown in Fig. 2 and the roller elements 36 are adapted to ride in the guideway 25 in guided relation with respect to the opposed surfaces of flanges 26 and 27.

Each of the shafts 34 has a plurality of teeth or tines 37 disposed therealong in rigid relation, teeth or tines 37 being curved forwardly and upwardly as shown in Fig. 2. It is preferred that the tines be formed in pairs with the inner ends curved to fit about the base or shaft 34 and each pair secured to the shaft by means of a fastener such as bolt 38 passing through the shaft. The bolt 38 is made of relatively soft material which may function as a shear pin to prevent breaking of the teeth or tines 17 in the event that an extremely large rock is encountered.

Shaft 17 which bears the spaced sprockets 29 and also provides the pivot point for the mounting member 14, further has an extension passing sidewise of one of the bearings 18 as shown in Fig. 1. A driven sprocket 39 is secured thereto and is driven in a clockwise direction upon roller chain 40 as viewed in Fig. 2. Roller chain 40 in turn is driven by a pinion 41 which is attached to the jack shaft 42 journaled across the brackets 22 as shown. The sprocket 41 and the jack shaft 42 are in driving engagement through roller chain 43 with the drive gear sprocket 44 associated with the transmission member 45 as shown in Figs. 1 and 2. The transmission member 45 may be powered through shaft 46 by a power-take-off (not shown) on the vehicle which draws the rock picker.

To the rear of the frame 10 is mounted a pair of diverging tracks 47 and 48 at each side of the frame, the tracks 47 being lowermost and the tracks 48 being uppermost. Track 48 diverges upwardly from track 47 and terminates in an arcuate rearward extension secured to a vertical brace 49 at each side of the frame. Each track 47 is likewise secured to one side of frame 49 and each pair of tracks 47 are in alignment and identical in structure to each pair of upper tracks 48. A bucket 50 composed of metal slats 51 has cross bracing members 52 and trolley wheels 53 at the upper portion of each side 54 and a trolley wheel 55 at a lower position on each side 54 of bucket 50. The trolley wheels 53 are adapted to engage respectively the tracks 47 and trolley wheels 55 are adapted to engage respectively the tracks 48. The bucket has an elongated upwardly extending rear portion 56 and a short forward, upwardly extending portion 57 and a bottom area 58 as shown in Fig. 2. The short forward portion is adapted to underlie a baffle 59 which is secured across the axle 11 and adapted to receive falling rocks and stones and to deflect them into the bucket member 50. The bucket trolley wheels 55 have an annular groove for receiving a cable 60 at each side of the bucket, each cable 60 being anchored to a crossbar 61 secured across the vertical brace 49. Each cable 60 passes around each trolley wheel 55 and extends rearwardly and upwardly to engage the trolley wheel 62 pivotally mounted at 63 at each side of brace 49. The cable 60 then passes forwardly and downwardly to the spool 64 anchored to the outer ends of shafts 65 which in turn is journaled across the upstanding brackets 22 at the forward portion of the rock picker frame. Shaft 65 is driven by a sprocket 66 and chain 67 which in turn engages a pinion 68 which is in driving connection through clutch 69 with shaft 70 extending transversely from the transmission box 45. A handle 71 is adapted to engage and disengage the clutch member to effect rotation of the spool members as desired. Strut rods 72 are secured one each at the sides of the frame so as to support and strengthen the rear upstanding frame 49 by its connection at 73 with each side thereof and with the respective connections 74 to the upstanding forward bracket members 22 as shown in Figs. 1 and 2.

Guideways 25 may be provided for a portion of their length with irregular surface formations 75 and preferably on the upper face of the inner flange 27 for its inclined length for a purpose about to be described. Details of the irregular surface are more clearly shown in Fig. 3.

A flexible sheet 76 made of such material as reinforced rubber is disposed transversely of the frame 10 and secured in depending relation at 77 so that the lower end 78 thereof will overlie in dragging relation the terrain at a position just forwardly of the forwardmost orbit of tine members 37. It is preferred that a plurality of spaced parallel slits 79 be formed at the lower edge and extending inwardly a short ways so that the sheet 76 can follow the contours of the terrain and pass over rocks in a local area without undue movement of the entire sheet member.

In the use and operation of my rock picking apparatus, the forward end 13 of frame 10 is secured to a drawbar such as a tractor hitch and the power-take-off is interconnected with the transmission shaft 46. Clutch handle 71 is placed out of engagement so that the bucket 50 will remain in the lowermost position as shown in Figs. 1 and 2. The power-take-off and tractor are operated so as to cause driving motion through chain 43, sprocket 51 and jack shaft 42, roller chain 40, and sprocket 39, and to the main drive shaft 17 of the rock picking mechanism. The main shaft 17 will cause the large sprockets 29 to rotate in a clockwise direction as viewed in Fig. 2 and thereby impart a revolving movement to the endless flexible element 14 so that tines 37 will move forwardly at the underside thereof and move rearwardly at the upper side. The chain 19 at each side of the mounting member 15 is adjusted upwardly or downwardly so as to pivot the mounting member about the shaft 17. The proper spacing is obtained with respect to the terrain with the curved teeth or tines 37 just scraping the surface of the ground or digging into the ground for removing sub-surface rocks if desired. With the forward movement of the frame 10 and the revolving motion of the teeth or tines 37, each row thereof will be caused to pick up rocks together with some earth clinging thereto as the teeth or tine members move forwardly at the underportion of the mounting member. The shafts 34, to which are attached each row of tines, is rotatably mounted in the lug journals 33 on roller chains 28 but are prevented from freely rotating by each of the pairs of arms 35 which are maintained in guided relation through the respective rollers 36 in the guideway 25. As the lowermost row of tines passes around the forward curvature of the flexible element, the roller 36 is caused to swing outwardly in trackway 25 and the tines will then effect a scooping motion to cast rocks and stones forwardly and also move forwardly some earth and debris. The rocks and stones which are not retained on the tines will accumulate on the sheet 76 and form a bank thereon against which the revolving tines will operate in their forwardmost orbit. Some of the rocks and stones will have most of the earth removed therefrom in the rolling and forward tossing movement and will ultimately be engaged and carried away by succeeding rows of tines. The excess dirt and debris will work off the ends and sides of sheet 76 and be redeposited on the terrain rearwardly of the rock picking device. Rocks forwardly of the device which engage the sheet 76 will flex upwardly a local portion because of the slit lines 79, and therefore only a minimum amount of power is required to drag the bank of rocks and stones along the ground.

As the rocks which are retained on the tines pass upwardly, the rollers 36 are caused to follow the guideway 25 in closer alignment with the chains 28. This will retain the tines in an upwardly formed cup as they travel the inclined pathway to the rear of the device. The roller elements 36 then run over the uneven surface 75 at each side of the mounting member and the arms 35 are caused to shake and vibrate, thus transmitting the same motion to the respective rows of tines. Earth and debris which still remains clinging to the rocks will be effectively removed by the shaking operation and fall downwardly to the terrain beneath the rock picking device. As the tines follow the flexible element over the rear sprockets 29, the guideway 25 deviates substantially from the aligned relation with chains 28 and roller members 36 cause the arms 35 to retract the curved tines, thus permitting rocks and stones to fall on the baffle 59 and into the bucket 50 without being forcibly ejected thereagainst. As the tines proceed downwardly, the original digging position is assumed and the cycle is repeated. When the bucket 50 is loaded with rocks, the clutch 71 is engaged thereby causing the chain 67 and sprocket 66 to rotate the shaft 65 and spool element 64. The cables 60 are wound upon the respective spools, thus causing the bucket 50 to ride upwardly with its trolley wheels 53 and 55 in rolling engagement with the respective pairs of tracks 47 and 48. Because of the diverging relation of the uppermost tracks 48 with the lower tracks 47, the bucket 50 is caused to tilt forwardly and assume the dotted line position as shown in Fig. 2. The rocks will therefore be dumped from the bucket to a pile or into a loading vehicle such as a truck.

It may thus be seen that I have devised a novel and useful rock picking device which is economical in operation and which will efficiently pick up rocks from the terrain and separate earth therefrom prior to accumulating and loading the rocks.

It will, of course, be understood that various changes may be made in the form, details, arrangement and proportions of the various parts without departing from the scope of my invention.

What I claim is:

1. In a mobile rock picker, the combination of a supporting frame, a revolvable element carried on said frame and being movable in an upright orbital path which lies generally in a plane disposed longitudinally of the frame, said revolvable element being adapted for connection to a source of rotary power and being constructed and arranged forwardly with respect to the frame adjacent the ground surface and thence upwardly and rearwardly, a plurality of curved scooping tines attached to said revolvable element for orbital movement therewith, said tines having rock pick-up ends extending generally forwardly of the frame when moving forwardly with said revolvable element adjacent the ground surface, and a flexible sheet carried by said frame and depending therefrom in forwardly spaced relation with the forwardmost orbital path of said tines, said flexible sheet dragging on the ground adjacent said tines, whereby rocks and earth scooped forwardly by said tines may be temporarily banked upon said dragging sheet to be agitated and thereby separated by movement of the sheet over the ground surface and by said tines passing through the bank of rocks and earth and such banked rocks will thereafter be scooped by said tines and removed.

2. In a mobile rock picker, the combination of a supporting frame, a revolvable element carried on said frame and being movable in an upright orbital path lying generally in a plane disposed longitudinally of the frame, said revolvable element being adapted for connection to a source of rotary power and being constructed and arranged forwardly with respect to the frame adjacent the ground surface and thence upwardly and rearwardly, a plurality of curved scooping tines attached to said revolvable element for orbital movement therewith, said tines having rock pick-up ends extending generally forwardly of the frame when moving forwardly with said revolvable element adjacent the ground surface, a flexible sheet carried by said frame and depending therefrom in forwardly spaced relation with the forwardmost orbital path of said tines, said flexible sheet dragging on the ground adjacent said tines, and means connected with said tines and with said frame and being constructed and arranged for shaking said tines, whereby rocks and earth scooped forwardly by said tines may be temporarily banked upon said dragging flexible sheet to be agitated and at least partially separated thereon by movement of the flexible sheet over the ground surface and by movement of said tines through the banked rocks and said rocks will subsequently be scooped by said shaking tines to have the remainder of the earth removed therefrom and to be carried upwardly away by the tines.

3. The structure recited in claim 1 wherein the lower end portion of said flexible sheet has a plurality of spaced and vertically disposed slits therein to form a plurality of sheet segments adapted to be individually deflected by the irregular ground surface and rocks thereon to vigorously agitate the mixture of rocks and earth carried on the sheet and to minimize spillage of rocks and earth from the sheet.

References Cited in the file of this patent

UNITED STATES PATENTS

| 1,139,168 | Culp et al. | May 11, 1915 |
| 1,442,979 | Shaw | Jan. 23, 1923 |

FOREIGN PATENTS

| 975,948 | France | Oct. 17, 1950 |